(12) United States Patent
Karasawa

(10) Patent No.: US 8,237,837 B2
(45) Date of Patent: Aug. 7, 2012

(54) IMAGE INPUT DEVICE, IMAGE DISPLAY DEVICE, AND IMAGE DISPLAY SYSTEM

(75) Inventor: Toru Karasawa, Kamiina-gun (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

(21) Appl. No.: 12/697,393

(22) Filed: Feb. 1, 2010

(65) Prior Publication Data

US 2010/0194908 A1 Aug. 5, 2010

(30) Foreign Application Priority Data

Feb. 4, 2009 (JP) .................................. 2009-023435

(51) Int. Cl.
- *H04N 5/222* (2006.01)
- *H04N 5/262* (2006.01)
- *G06F 3/033* (2006.01)

(52) U.S. Cl. .................... 348/333.01; 348/239; 715/863; 345/158

(58) Field of Classification Search ............... 348/222.1, 348/744, 333.01, 239; 345/158
See application file for complete search history.

(56) References Cited

U.S. PATENT DOCUMENTS

| | | | |
|---|---|---|---|
| 2002/0126161 A1* | 9/2002 | Kuzunuki et al. | 345/863 |
| 2005/0078052 A1 | 4/2005 | Morichika | |
| 2006/0202953 A1* | 9/2006 | Pryor et al. | 345/156 |
| 2008/0013826 A1* | 1/2008 | Hillis et al. | 382/154 |
| 2009/0110235 A1* | 4/2009 | Marti | 382/103 |
| 2010/0199232 A1* | 8/2010 | Mistry et al. | 715/863 |

FOREIGN PATENT DOCUMENTS

JP 2005-123707 A 5/2005

OTHER PUBLICATIONS

U.S. Appl. No. 61/149,636; Mistry et al., "WUW—Wear Ur World, A Wearable Gestural Interaface"; filed Feb. 3, 2009.*

* cited by examiner

*Primary Examiner* — Tuan Ho
*Assistant Examiner* — Shahbaz Nazrul
(74) *Attorney, Agent, or Firm* — AdvantEdge Law Group, LLC

(57) ABSTRACT

An image input device includes: an image capture unit which captures an image of a predetermined image capture range to produce image information; an image analysis unit which, when a range specifier for specifying a partial range within the image capture range enters the image capture range of the image capture unit, detects the range specifier based on the image information, and determines the range specified by the range specifier; an expansion processing unit which performs expansion process for expanding the determined range of the image information produced by the image capture unit when the range is determined by the image analysis unit; and an image information output unit which outputs the image information subjected to the expansion process to the outside.

9 Claims, 15 Drawing Sheets

IMAGE INPUT DEVICE, IMAGE DISPLAY DEVICE, AND IMAGE DISPLAY SYSTEM

CROSS-REFERENCE

The present application claims priority from Japanese Patent Application No. 2009-023435 filed on Feb. 4, 2009, which is hereby incorporated by reference in its entirety.

BACKGROUND

An image display system which includes an image input device for capturing an image of manuscript or other subjects (such as a document camera) and an image display device for displaying the image captured by the image input device (such as a projector) is known. According to the image display system having this structure, a part of the subject can be expanded (enlarged) for display by using a zoom function of the image input device or the image display device (for example, see Japanese Patent Publication No. 2005-123707).

For expanding a part of the image by the zoom function, however, a user needs to perform both operation for specifying an expansion rate and operation for specifying a position to be expanded (expansion position) by press of an operation key or by other methods. Moreover, the user needs to repeatedly press the operation key in some cases for specifying the expansion rate or expansion position, which is complicated for the user.

SUMMARY

Various embodiments may provide a technology capable of solving at least a part of the problems described above. The invention can be realized in the following aspects or embodiments.

According to at least one embodiment of the disclosure, there is provided an image input device which includes: an image capture unit which captures an image of a predetermined image capture range to produce image information; an image analysis unit which, when a range specifier for specifying a partial range within the image capture range enters the image capture range of the image capture unit, detectes the range specifier based on the image information, and determines the range specified by the range specifier; an expansion processing unit which performs expansion process for expanding the determined range of the image information produced by the image capture unit when the range is determined by the image analysis unit; and an image information output unit which outputs the image information subjected to the expansion process to the outside.

According to the image input device having this structure, the image analysis unit detects the range specifier entering the image capture range of the image capture unit and determines the specified range when the range is specified by the range specifier. Then, the expansion process for expanding the specified range is performed by the expansion processing unit, and the processed image information is outputted from the image information output unit. Thus, the partial range within the image capture range can be expanded just by specifying a desired range with the range specifier, which eliminates the necessity for performing a complicated operation.

The image input device according to the above embodiment, wherein the image analysis unit detects a human hand as the range specifier.

According to the image input device having this structure, the image analysis unit can detect a human hand as the range specifier. Thus, the range to be expanded can be specified without using a particular tool or the like.

According to at least one embodiment of the disclosure, there is provided an image display device which includes: an image information input unit to which image information is inputted from outside; an image analysis unit which, when a range specifier for specifying a partial range within the image enters an image based on the image information, detects the range specifier based on the image information, and determines the range specified by the range specifier; an expansion processing unit which performs expansion process for expanding the specified range of the image information inputted to the image information input unit when the range is determined by the image analysis unit; and an image displaying unit which forms and displays an image based on the image information subjected to the expansion process.

According to the image display device having this structure, the image analysis unit detects the range specifier entering the image and determines the specified range when the range is specified by the range specifier. Then, the expansion process for expanding the specified range is performed by the expansion processing unit, and the image based on the processed image information is formed and displayed by the image displaying unit. Thus, a partial range within the image can be expanded just by specifying a desired range with the range specifier, which eliminates the necessity for performing a complicated operation.

The image display device according to the above embodiment, wherein the image analysis unit detects a human hand as the range specifier.

According to the image display device having this structure, the image analysis unit can detect a human hand as the range specifier. Thus, the range to be expanded can be specified without using a particular tool or the like.

According to at least one embodiment of the disclosure, there is provided an image display system which includes: an image capture unit which captures an image of a predetermined image capture range to produce image information; an image analysis unit which, when a range specifier for specifying a partial range within the image capture range enters the image capture range of the image capture unit, detects the range specifier based on the image information, and determines the range specified by the range specifier; an expansion processing unit which performs expansion process for expanding the determined range of the image information produced by the image capture unit when the range is determined by the image analysis unit; and an image displaying unit which forms and displays an image based on the image information subjected to the expansion process.

According to the image display system having this structure, the image analysis unit detects the range specifier entering the image capture range of the image capture unit and determines the specified range when the range is specified by the range specifier. Then, the expansion process for expanding the specified range is performed by the expansion processing unit, and the image based on the processed image information is formed and displayed by the image displaying unit. Thus, the partial range within the image capture range can be expanded just by specifying a desired range with the range specifier, which eliminates the necessity for the performing complicated operation.

The image display system according to the above aspect, wherein the image analysis unit detects a human hand as the range specifier.

According to the image display system having this structure, the image analysis unit can detect a human hand as the range specifier. Thus, the range to be expanded can be specified without using a particular tool or the like.

According to at least one embodiment of the disclosure, there is provided an image display system which includes an image input device and an image display device. The image input device includes: an image capture unit which captures an image of a predetermined image capture range to produce image information; an image information output unit which outputs the image information produced by the image capture unit to the image display device; an image analysis unit which, when a range specifier for specifying a partial range within the image capture range enters the image capture range of the image capture unit, detects the range specifier based on the image information, and determines the range specified by the range specifier; and a range information output unit which outputs range information corresponding to the range determined by the image analysis unit to the image display device. The image display device includes: an image information input unit to which the image information is inputted from the image input device; a range information input unit to which the range information is inputted from the image input device; an expansion processing unit which performs expansion process for expanding the range based on the range information to the image information inputted to the image information input unit when the range information is inputted to the range information input unit; and an image displaying unit which forms and displays an image based on the image information subjected to the expansion process.

According to the image display system having this structure, the image input device outputs the image information produced by the image capture unit and the range information corresponding to the specified range to the image display device when the range is specified by the range specifier entering the image capture range of the image capture unit. Then, the image display device performs the expansion process for expanding the range corresponding to the range information to the image information, and forms and displays the image based on the processed image information. Thus, the partial range within the image capture range can be expanded just by specifying a desired range with the range specifier, which eliminates the necessity for performing a complicated operation.

BRIEF DESCRIPTION OF THE DRAWINGS

Non-limiting and non-exhaustive embodiments of the present disclosure will be described with reference to the accompanying drawings, wherein like reference numbers reference like elements.

FIGS. 5A and 5B illustrate operation of the image display system, wherein: FIG. 5A shows a capture image captured by an image capture unit; and FIG. 5B shows an image projected on a projection surface.

FIGS. 6A and 6B illustrate operation of the image display system, wherein: FIG. 6A shows a capture image captured by the image capture unit; and FIG. 6B shows an image projected on the projection surface.

FIGS. 7A and 7B illustrate operation of the image display system, wherein: FIG. 7A shows a capture image captured by the image capture unit; and FIG. 7B shows an image projected on the projection surface.

FIGS. 8A and 8B illustrate operation of the image display system, wherein: FIG. 8A shows a capture image captured by the image capture unit; and FIG. 8B shows an image projected on the projection surface.

DESCRIPTION OF EMBODIMENTS

An image display system embodying the invention is hereinafter described with reference to the drawings.

First Embodiment

Figure 1:
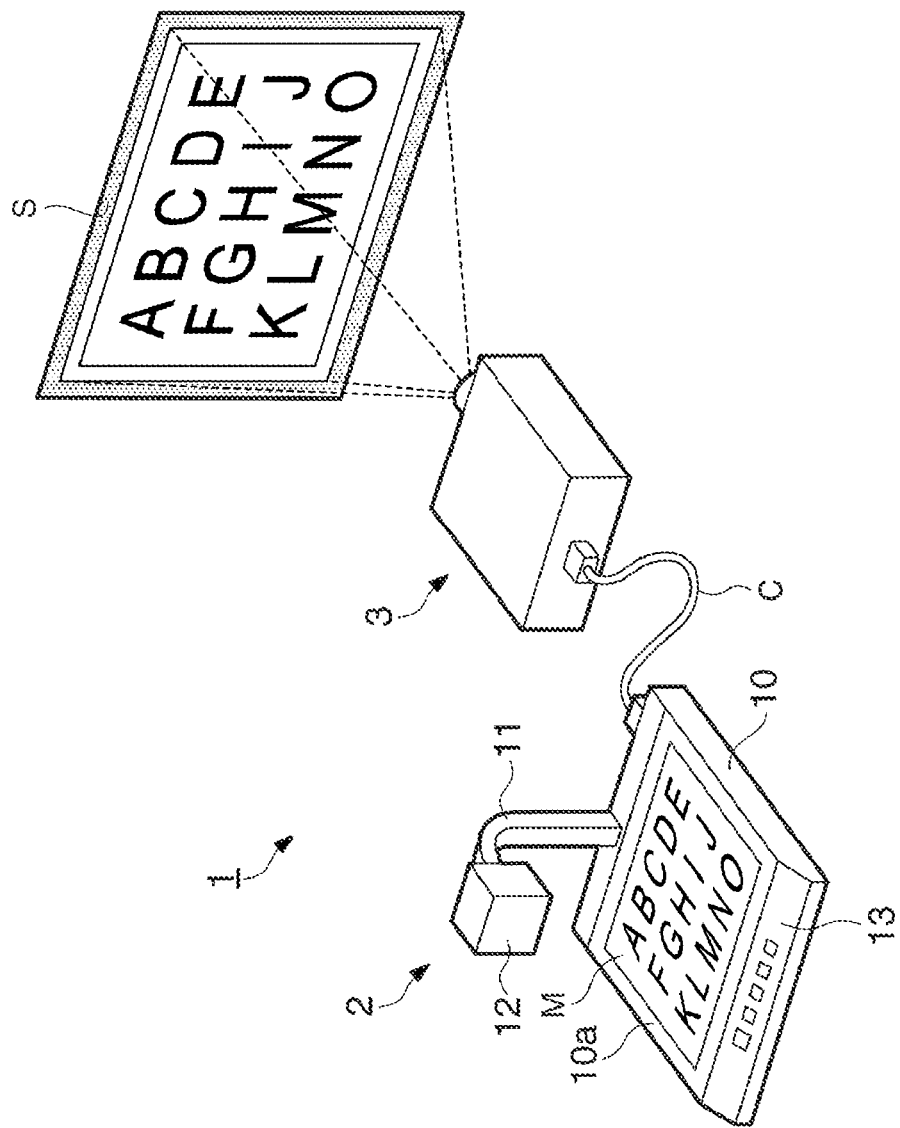
FIG. 1 is a perspective view illustrating an image display system according to a first embodiment.

FIG. 1 is a perspective view of an image display system according to a first embodiment.

As illustrated in FIG. 1, an image display system 1 in this embodiment includes a document camera 2 as an image input device, and a projector 3 as an image display device.

The document camera 2 has a box-shaped housing 10, a hollow support arm 11 extending upward from the end of the housing 10, and an image capture unit 12 fixed to the upper end of the support arm 11. A stage 10a having rectangular shape as viewed from above (from the image capture unit 12), and an input operation unit 13 having a plurality of operation keys are disposed on the upper surface of the housing 10. A subject M such as a manuscript is placed on the stage 10a, and the document camera 2 captures an image of the subject M by the function of the image capture unit 12 to produce image information, and outputs the image information to an external device (a projector 3 in this embodiment) via a cable C.

The projector 3 is a typical projector which forms an image based on the inputted image information and projects and displays the formed image on an external projection surface S (such as a screen). According to the image display system 1 in this embodiment, the projector 3 projects an image based on image information inputted from the document camera 2, that is, an image captured by the image capture unit 12.

When a user defines a rectangular area by using fingers of both hands inserted into an image capture range of the image capture unit 12, that is, the area above the stage 10a (for example, see FIG. 6A), the document camera 2 detects the hands of the user (human hands) inserted into the range as range specifiers, and performs process for expanding (enlarging) the range surrounded by the fingers (expansion process) for the image information. In this case, the range specified by the user, that is, the range surrounded by the fingers is expanded and projected from the projector 3 (details of the expansion process will be described later).

Figure 2:
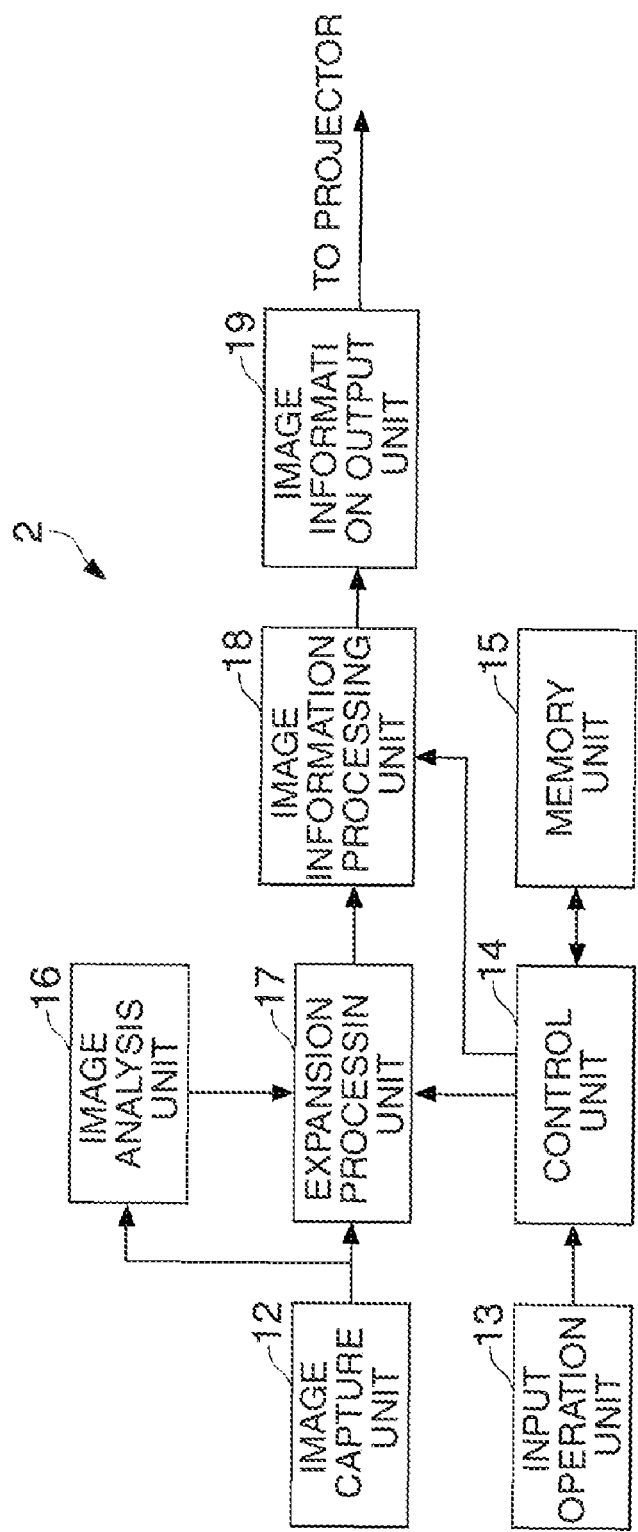
FIG. 2 is a block diagram showing a general structure of a document camera according to the first embodiment.
Figure 3B:
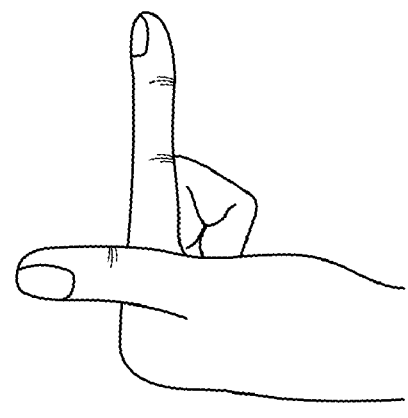
FIGS. 3A through 3D show range specifiers.
Figure 3D:
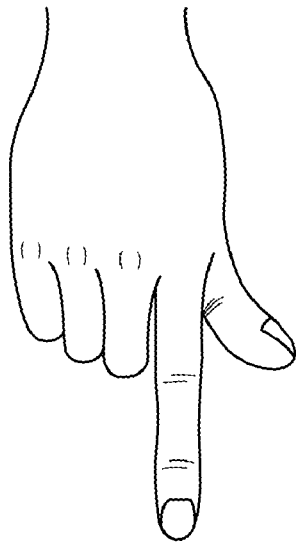
Figure 3A:
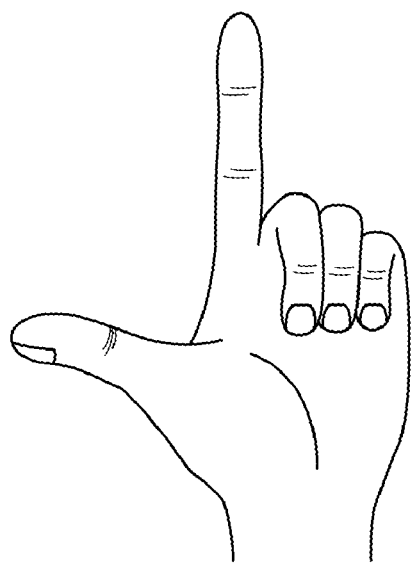
Figure 3C:
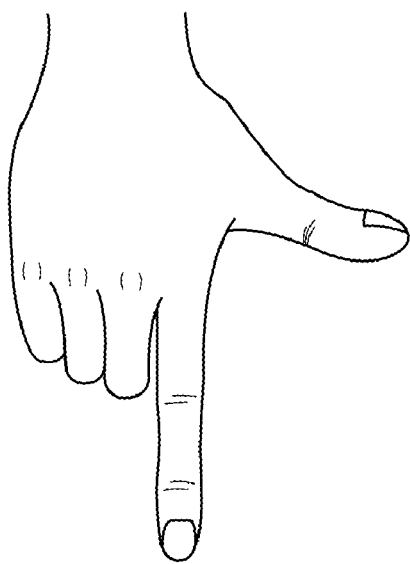

FIG. 2 is a block diagram showing a general structure of the document camera 2.

As shown in FIG. 2, the document camera 2 includes a control unit 14, a memory unit 15, an image analysis unit 16, an expansion processing unit 17, an image information processing unit 18, an image information output unit 19 and other units as well as the image capture unit 12 and the input operation unit 13 described above. These units are all accommodated in the housing 10.

The control unit 14 having a CPU (central processing unit), a RAM (random access memory) and others supervises and controls operation of the document camera 2 by operating under control program stored in the memory unit 15. Thus, the control unit 14 functions as a computer in cooperation with the memory unit 15.

The memory unit 15 has non-volatile memory such as mask ROM (read only memory), flash memory, and FeRAM (ferroelectric RAM). The memory unit 15 stores the control program for controlling operation of the document camera 2 and various types of setting data for specifying operation conditions and the like of the document camera 2.

The input operation unit 13 for receiving input operation from the user has a plurality of operation keys through which various requests are issued to the document camera 2. The operation keys provided on the input operation unit 13 involve "power source key" for switching between ON and OFF of power source, "expansion display reset key" for stopping the expansion process discussed above, and other keys. When the user operates any of the operation keys on the input operation unit 13, the input operation unit 13 receives the input operation and outputs an operation signal corresponding to the user's input operation to the control unit 14.

The image capture unit 12 has an image capture element (not shown) constituted by a CCD (charge coupled device) sensor and a CMOS (complementary metal oxide semiconductor) sensor, and an image capture lens (not shown) which forms an image of light reflected by the subject M on a light receiving surface of the image capture element. The image capture unit 12 can capture an image of a rectangular range covering substantially the entire area of the stage 10a. A plurality of pixels (light receiving pixels) are disposed in matrix on the light receiving surface of the image capture element such that the image capture unit 12 can create image information according to the light receiving amounts of the respective pixels at the predetermined frame rate. The image information contains plural pixel values corresponding to all of the pixels on the image capture element, and is sequentially outputted to the image analysis unit 16 and the expansion processing unit 17 via a cable (not shown) wired inside the support arm 11.

Figure 4A:
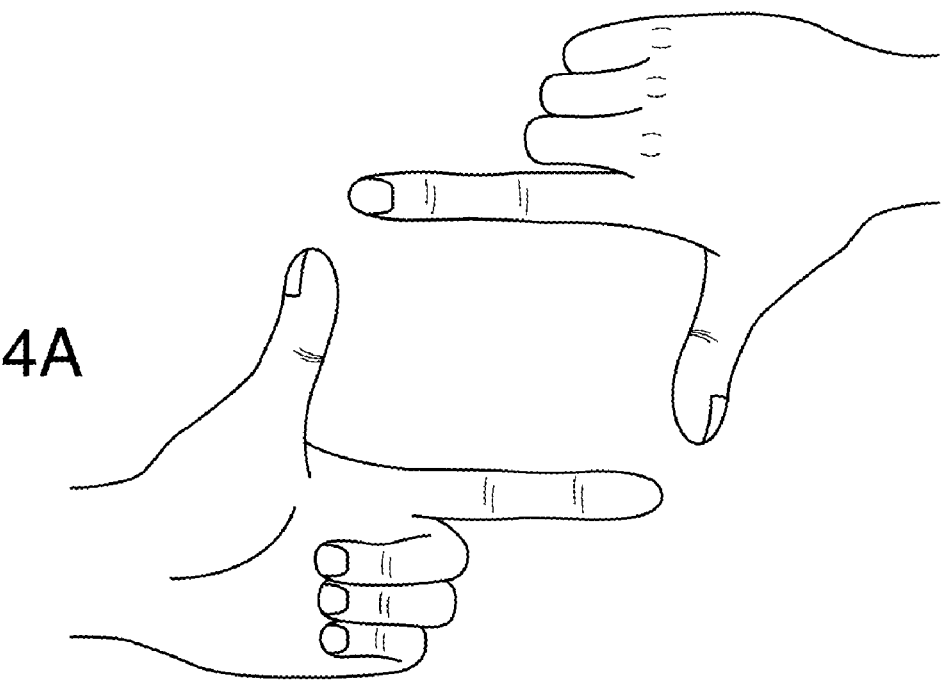
FIGS. 4A and 4B illustrate how a rectangular range is specified by the range specifiers.
Figure 4B:
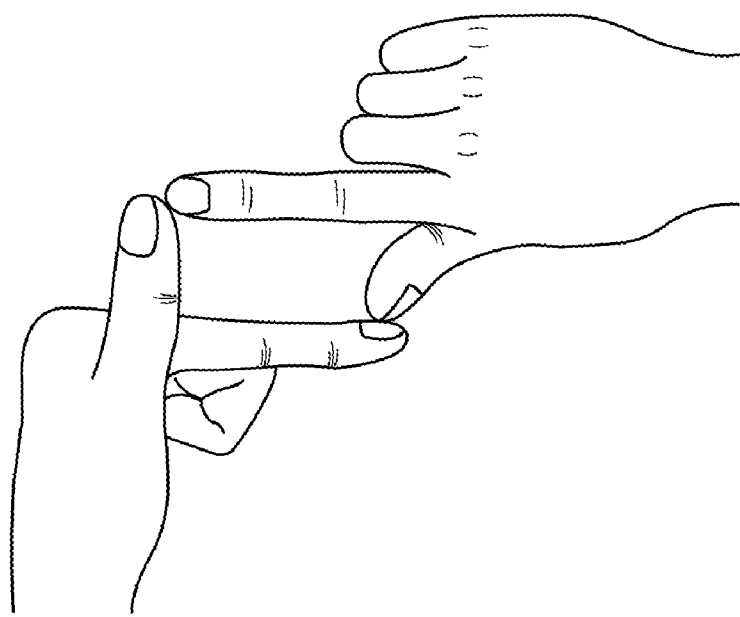

The image analysis unit 16 analyzes the image captured by the image capture unit 12 (capture image) based on the inputted image information to detect the range specifier having entered the capture image, that is, a human hand. More specifically, the image analysis unit 16 is designed to detect a human hand forming L shape by using two fingers (see FIGS. 3A through 3D, for example) based on the shape and color of the hand. When the user forms L shapes by using both hands to specify a substantially rectangular range by combining the two L shapes thus formed (see FIGS. 4A and 4B), the image analysis unit 16 determines the specified range (specification range).

The expansion processing unit 17 performs expansion process for expanding the range specified by the image analysis unit 16 for the image information inputted from the image capture unit 12 in response to the request from the control unit 14, and outputs the processed image information to the image information processing unit 18. The expansion processing unit 17 outputs the image information inputted from the image capture unit 12 as it is to the image information processing unit 18 until the range is specified by the range specifier.

The image information processing unit 18 converts the image information inputted from the expansion processing unit 17 into image information in the form usable by the projector 3, and outputs the converted image information to the image information output unit 19. The image information output unit 19 has a not-shown output terminal to output the image information inputted from the image information processing unit 18 to the projector 3 via the cable C connected to the output terminal (see FIG. 1).

Figure 9:
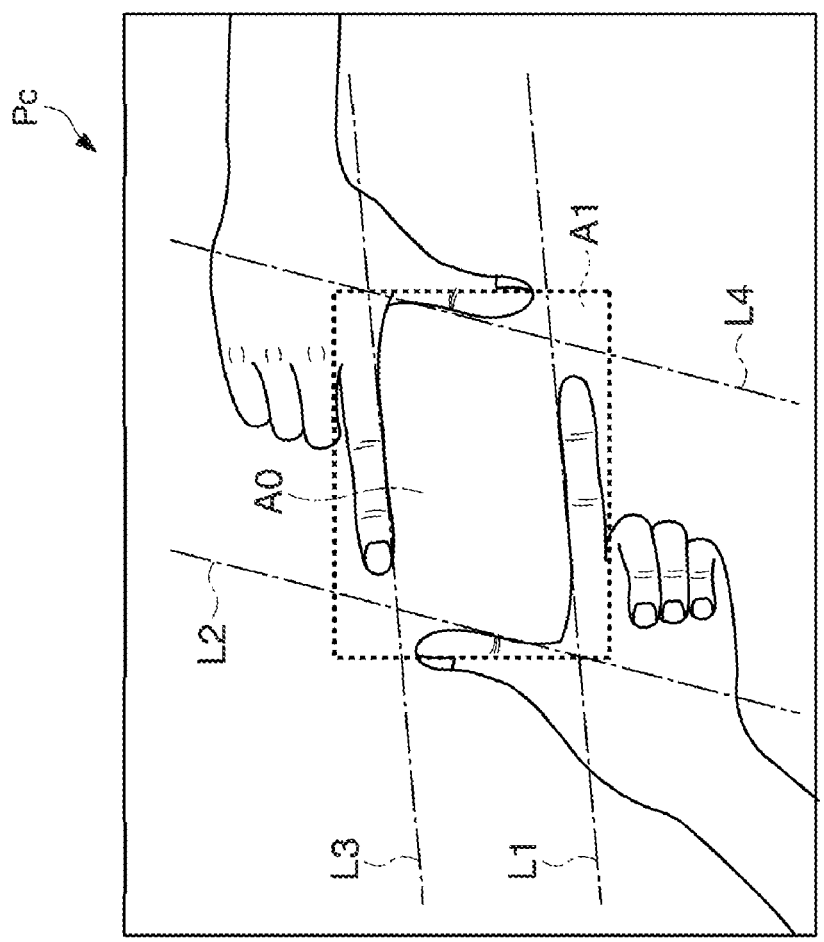
FIG. 9 illustrates operation of the image display system, showing a capture image captured by the image capture unit.

FIGS. 5A through 9 illustrate operation of the image display system 1. FIGS. 5A, 6A, 7A, and 8A show capture images captured by the image capture unit 12, and FIGS. 5B, 6B, 7B, and 8B show images projected (displayed) on the projection surface S. FIG. 9 illustrates a capture image captured by the image capture unit 12 but does not show the subject M contained in the capture image.

Figure 5B:
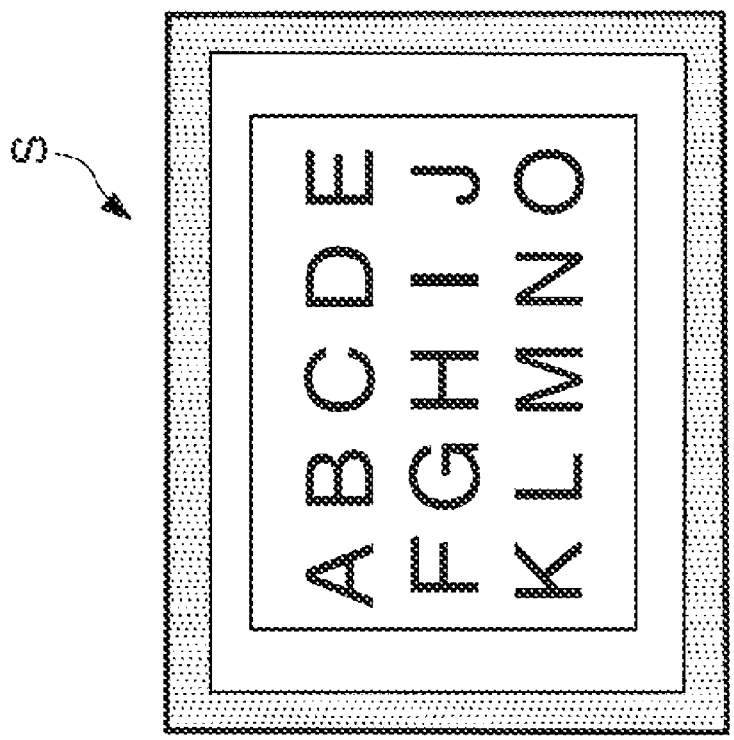
Figure 5A:
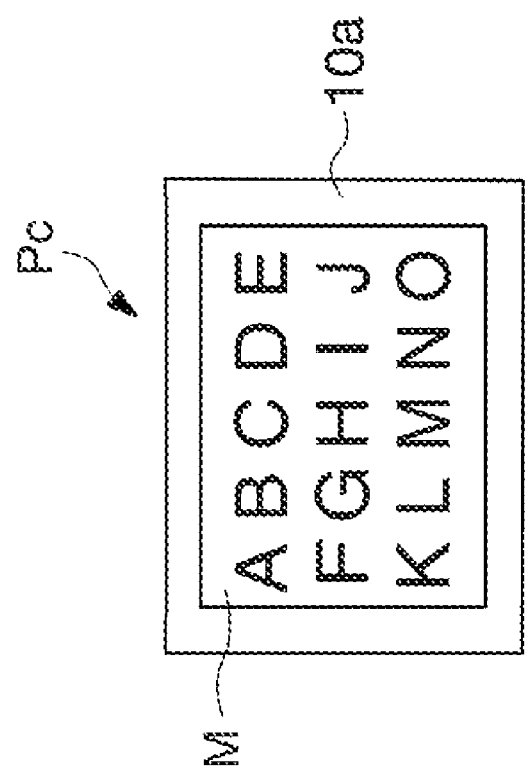

When the power source key of the input operation unit 13 is operated with the subject M (document) placed on the stage 10a of the document camera 2, the document camera 2 is brought into an operable condition (ON condition) and starts capturing the image of the subject M by the image capture unit 12. The image capture unit 12 captures a capture image Pc containing the subject M placed on the stage 10a as illustrated in FIG. 5A. The expansion processing unit 17 does not carry out expansion process until the specification range is specified by the range specifier but outputs the image information produced by the image capture unit 12 as it is to the image information processing unit 18. Thus, as illustrated in FIG. 5B the entire area of the capture image Pc captured by the image capture unit 12 is projected from the projector 3 onto the projection surface S.

Figure 6B:
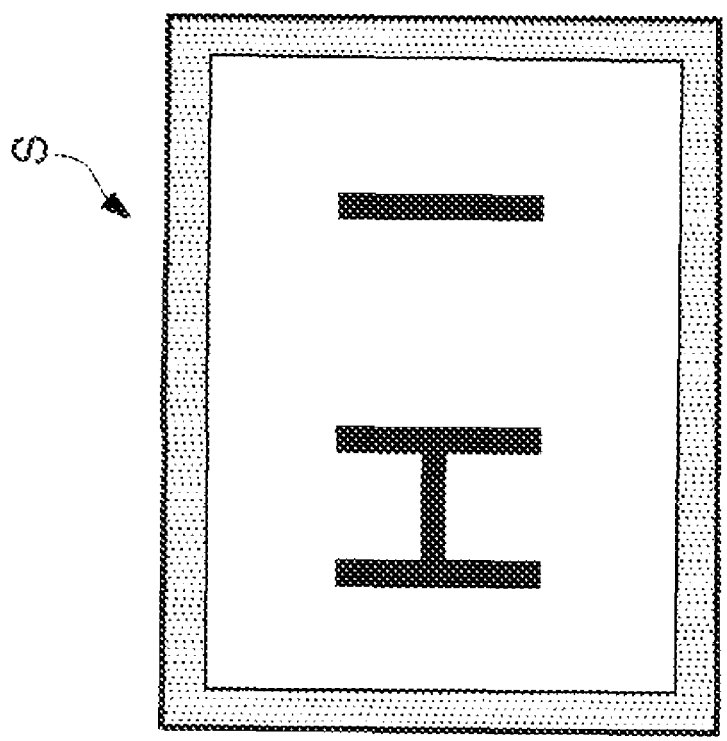
Figure 6A:
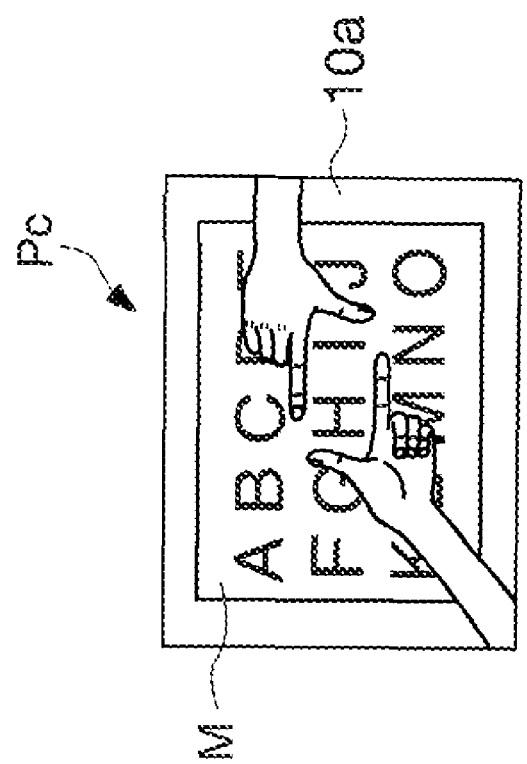
Figure 7B:
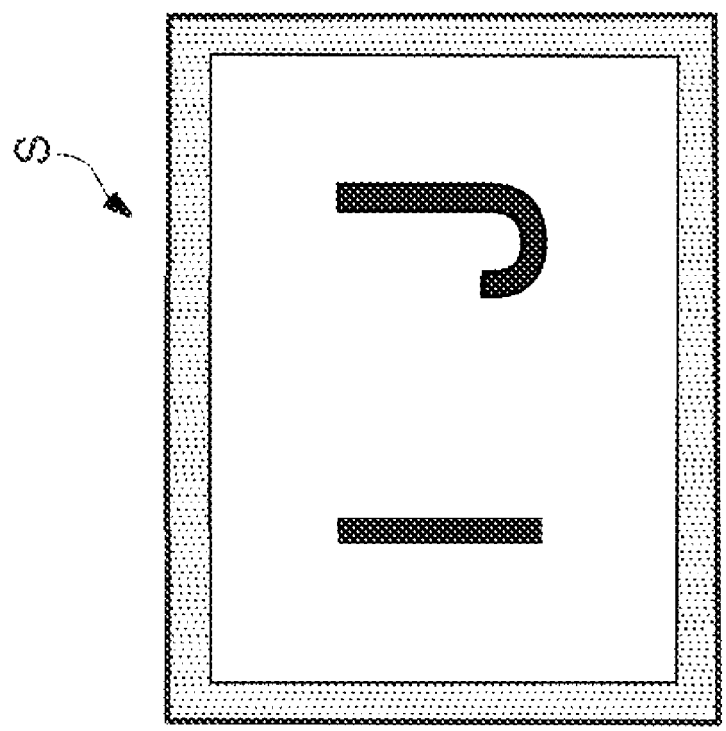
Figure 7A:
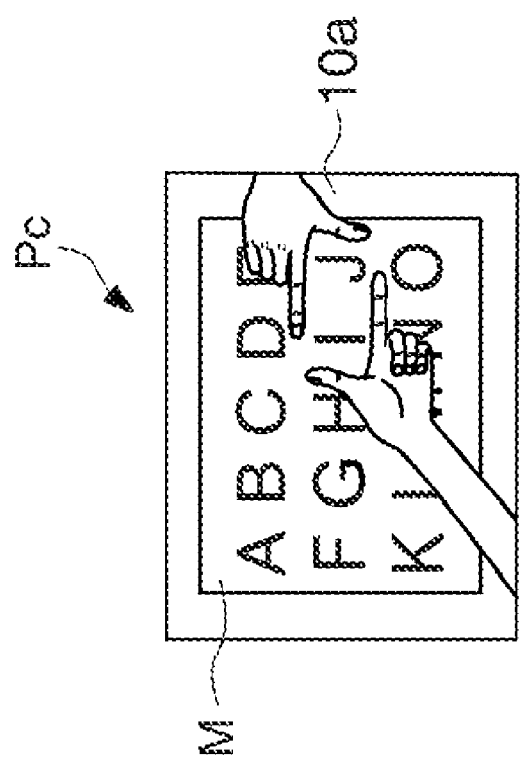
Figure 8B:
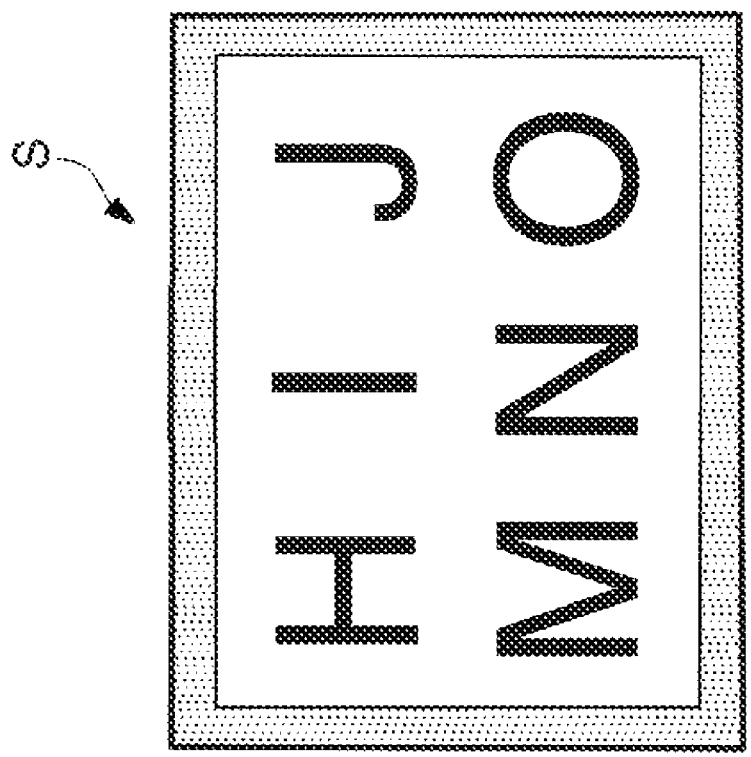
Figure 8A:
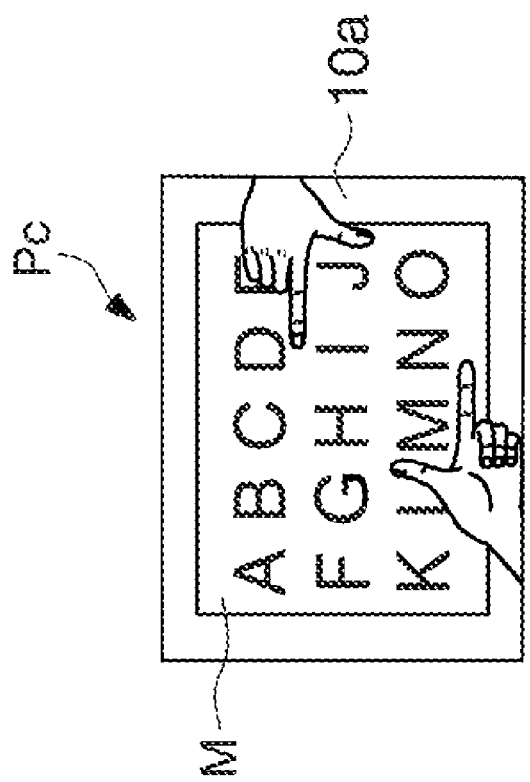

When the user specifies a substantially rectangular range by combining L shapes formed by both hands inserted into the image capture range of the image capture unit 12, i.e., the area above the stage 10a as illustrated in FIG. 6A, the image analysis unit 16 detects the range specifier having entered the capture image Pc, that is, the hands forming the L shapes. Then, as illustrated in FIG. 9, the image analysis unit 16 calculates lines similar to the inner edges of the fingers forming the L shapes, i.e., four lines L1, L2, L3, and L4 forming the two L shapes, and determines the range surrounded by the four lines L1, L2, L3, and L4 as a specification range A0. The image analysis unit 16 further determines the smallest rectangular range containing the calculated specification range A0 and having the same aspect ratio and direction as those of the capture image Pc as a display range A1, and outputs range information showing the display range A1 to the expansion processing unit 17. Then, the image analysis unit 16 detects the range specifier and repeats output of the range information while the user is inserting the range specifier into the image capture range.

When the range information is inputted from the image analysis unit 16 to the expansion processing unit 17, the expansion processing unit 17 performs expansion process for expanding the part contained in the display range A1 for the image information inputted from the image capture unit 12 and outputs the processed image information to the image information processing unit 18. More specifically, the expansion processing unit 17 deletes pixel values positioned outside the display range A1 from the image information inputted from the image capture unit 12 and interpolates pixels values equivalent to the deleted pixel values within the display range A1 to output image information constituted by the same number of pixel values as those of image information not expanded.

When the user stops forming L shapes by folding all the fingers or by other methods, output of the range information from the image analysis unit 16 stops accordingly. After the user withdraws both hands from the image capture range, the expansion processing unit 17 continues the process for expanding the display range A1 based on the range information finally inputted. As a result, the expanded image of the display range A1, i.e., the specification range A0 specified by the user and the vicinity of the specification range A0 is projected on the projection surface S (see FIG. 6B).

The image display system 1 operating in the manner described above can expand and display the desired range specified by the L shapes formed by both hands of the user within the image capture range. A different position within the image capture range can be expanded by moving the position of the specification range A0, that is, the positions of both hands forming the L shapes (see FIGS. 7A and 7B). Moreover, the expansion rate at the time of expansion can be changed by narrowing or enlarging the space between the two L shapes (see FIGS. 8A and 8B).

For returning to the condition of displaying the entire area of the capture image Pc (normal display condition) from the condition of displaying the expanded specification range A0 (display range A1) (expansion display condition), the user operates the expansion display reset key of the input operation unit 13. When receiving an operation of the expansion display reset key from the user, the control unit 14 allows the expansion processing unit 17 to stop expansion process. Then, the expansion processing unit 17 stops expansion process in response to the request from the control unit 14 such that the image display system 1 can return to the normal display condition.

The image display system 1 may be designed to return to the normal display condition when a predetermined object enters the image capture range of the image capture unit 12. For example, the image display system 1 may return to the normal display condition when the image analysis unit 16 detects the user's hand inserted to the image capture range with all the fingers open.

Alternatively, the image display system 1 may return to the normal display condition when the range specifier specifies the entire area of the image capture range. However, for surrounding the specification range A0 by the fingers forming the L shapes as in this embodiment, the range specifier needs to be located outside the image capture range when specifying the entire area of the image capture range. In this case, the image analysis unit 16 cannot detect the range specifier. For solving this problem, the display range displayed in the normal display condition is set smaller than the image capture range of the image capture unit 12, and the image display system 1 returns to the normal display condition when the specification range A0 specified by the user is larger than the display range.

Accordingly, the image display system 1 (document camera 2) according to this embodiment can provide the following advantages.

(1) According to the image display system 1 (document camera 2) in this embodiment, the image analysis unit 16 detects the range specifier (user's hands) having entered the image capture range of the image capture unit 12 and determines the specified range when the range is specified by the range specifier. Then, the expansion processing unit 17 performs expansion process for expanding the specified range, and the image information output unit 19 outputs the processed image information to the projector 3. Thus, a desired range is only required to be specified by the range specifier for expanding the desired range as a part of the image capture range, and the necessity for performing a complicated operation can be eliminated.

(2) According to the image display system 1 (document camera 2) in this embodiment, the image analysis unit 16 detects human hands as the range specifier. Thus, a range to be expanded can be specified without using a particular tool or the like.

Second Embodiment

An image display system according to a second embodiment is hereinafter described. Similar reference numbers are given to elements similar to those in the first embodiment, and the same detailed explanation is not repeated.

The image display system 1 in this embodiment includes the document camera 2 and the projector 3 similarly to the first embodiment (see FIG. 1). Though not shown in the figure, the document camera 2 in this embodiment is a typical document camera which does not include the image analysis unit 16 and the expansion processing unit 17 (see FIG. 2). Thus, image information produced by the image capture unit 12 is directly outputted to the image information processing unit 18, and image information corresponding to the entire area of the image capture range is outputted from the image information output unit 19. However, the projector 3 in this embodiment has functions similar to those of the image analysis unit 16 and the expansion processing unit 17 such that the range specified by the user can be expanded and displayed similarly to the first embodiment.

Figure 10:
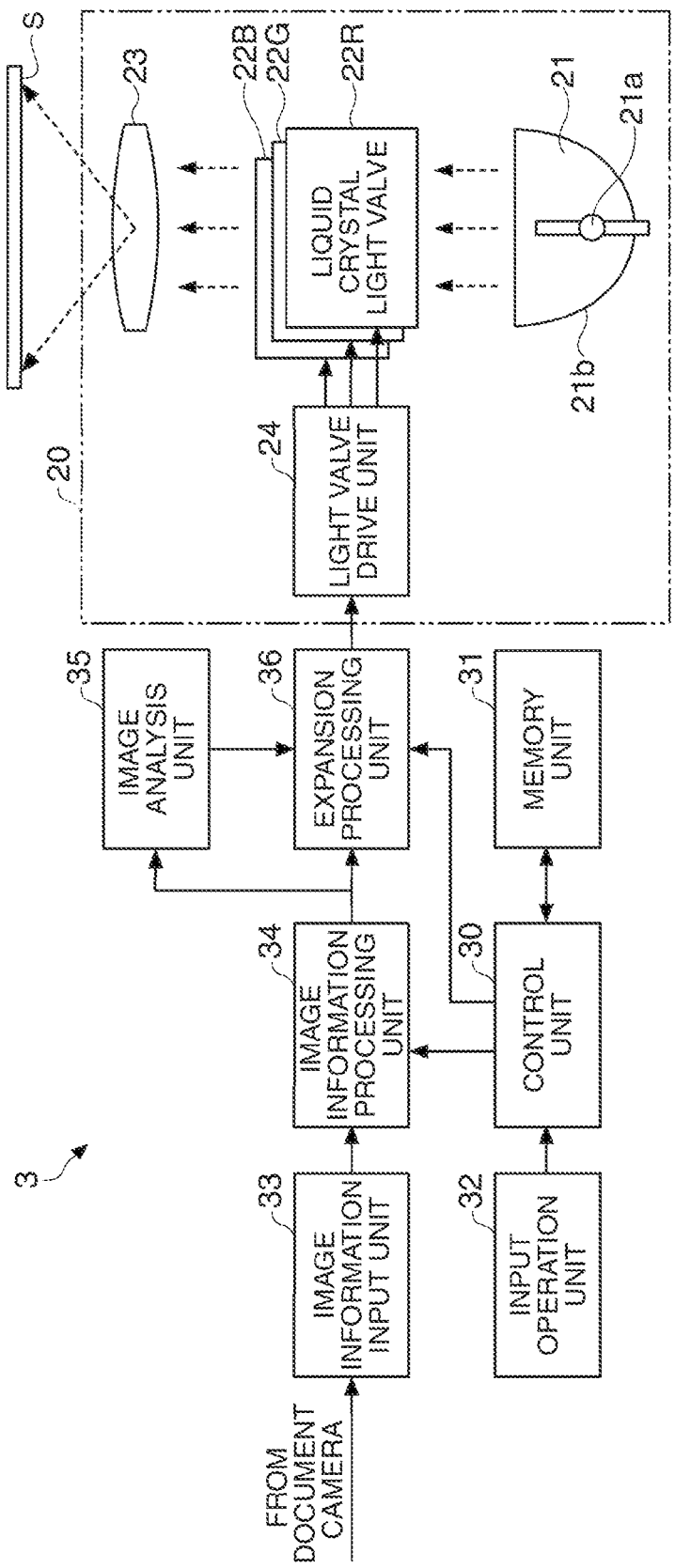
FIG. 10 is a block diagram showing a general structure of a projector according to a second embodiment.

FIG. 10 is a block diagram showing a general structure of the projector 3 in this embodiment. As shown in FIG. 10, the projector 3 includes an image projection unit 20, a control unit 30, a memory unit 31, an input operation unit 32, an image information input unit 33, an image information processing unit 34, an image analysis unit 35, an expansion processing unit 36, and other units.

The image projection unit 20 has a light source 21, three liquid crystal light valves 22R, 22G, and 22B as light modulation devices, a projection lens 23 as projection system, a light valve drive unit 24, and other components. The image projection unit 20 corresponds to an image displaying unit which forms an image by modulating light emitted from the light source 21 by the function of the liquid crystal light valves 22R, 22G, and 22B, and projects the image from the projection lens 23 to the projection surface S for display.

The light source 21 has a discharge-type light source lamp 21a constituted by an extra-high pressure mercury lamp, a metal halide lamp or the like, and a reflector 21b for reflecting light radiated from the light source lamp 21a toward the liquid crystal light valves 22R, 22G, and 22B. Light emitted from the light source 21 is converted into light having substantially uniform luminance distribution by not-shown integrator system. Then, the converted light is divided into color light components in three light primary colors of red (R), green (G), and blue (B), and the respective light components enter the corresponding liquid crystal light valves 22R, 22G, and 22B.

Each of the liquid crystal light valves 22R, 22G, and 22B is constituted by a liquid crystal panel having liquid crystals sealed between a pair of transparent substrates, for example. Each of the liquid crystal light valves 22R, 22G, and 22B has a plurality of pixels disposed in matrix (not shown), and drive voltage is applied to each pixel of the liquid crystals. When the light valve drive unit 24 applies drive voltage to each pixel according to the inputted image information, the light transmissivity corresponding to the image information is set for each pixel. Thus, the light emitted from the light source 21 is modulated while passing through the liquid crystal light valves 22R, 22G, and 22B, and an image based on the image information is formed for each color light. The images in the respective colors are combined for each pixel by not-shown color combining system to form a color image. The color image thus formed is expanded and projected through the projection lens 23.

The control unit 30 has a CPU, a RAM and the like, and operates under control program stored in the memory unit 31 to supervise and control the operation of the projector 3. Thus, the control unit 30 functions as a computer in cooperation with the memory unit 31.

The memory unit 31 has non-volatile memory such as mask ROM, flash memory, and FeRAM. The memory unit 31 stores the control program for controlling the operation of the projector 3, and various setting data for specifying operation conditions and the like of the projector 3, and others.

The input operation unit 32 for receiving an input operation from the user has a plurality of operation keys for issuing various requests to the projector 3. The operation keys of the input operation unit 32 include "power source key" for switching between ON and OFF of power source, "expansion display reset key" for stopping expansion process, and other keys. When the user operates any of the operation keys of the input operation unit 32, the input operation unit 32 receives the input operation and outputs operation signal corresponding to the user's operation to the control unit 30. The input operation unit 32 may have a remote controller performing remote operation (not shown). In this case, the remote controller transmits an infrared operation signal corresponding to the user's operation, and a not-shown remote control signal receiving unit receives the operation signal and transfers the signal to the control unit 30.

The image information input unit 33 has a not-shown input terminal, and image information outputted from an external device is inputted to the input terminal of the image information input unit 33 through the cable C (see FIG. 1). Thus, according to this embodiment, image information indicating the capture image Pc captured by the document camera 2 is inputted to the input terminal. The image information inputted to the image information input unit 33 is supplied to the image information processing unit 34.

The image information processing unit 34 converts the image information inputted from the image information input unit 33 into image information indicating gradations of the respective pixels of the liquid crystal light valves 22R, 22G, and 22B, and outputs the converted image information to both the image analysis unit 35 and the expansion processing unit 36. The image information converted in this step is provided for each of the color lights R, G, and B, and contains plural pixel values corresponding to all the pixels of the liquid crystal light valves 22R, 22G, and 22B. The pixel values determine transmissivity of the corresponding pixels, and intensities (gradations) of lights emitted from the respective pixels of the liquid crystal light valves 22R, 22G, and 22B are specified by the pixel values.

The image analysis unit 35 analyzes the capture image Pc captured by the document camera 2 based on the image information inputted from the image information processing unit 34 to detect a range specifier having entered the capture image Pc, that is, human hands, and determine the range specified by the range specifier.

The expansion processing unit 36 performs expansion process for expanding the range specified by the image analysis unit 35 for the image information inputted from the image information processing unit 34, and outputs the processed image information to the light valve drive unit 24. The expansion processing unit 36 outputs the image information inputted from the image information processing unit 34 as it is to the light valve drive unit 24 until the range is specified by the range specifier.

When the light valve drive unit 24 drives the liquid crystal light valves 22R, 22G, and 22B according to the image information inputted from the expansion processing unit 36, the liquid crystal light valves 22R, 22G, and 22B form an image based on the image information. Then, the image is projected from the projection lens 23 onto the projection surface S.

According to the image display system 1 having this structure in this embodiment, the projector 3 is brought into an operable condition (ON condition) when the power source key of the input operation unit 32 is operated. Then, image projection is initiated based on the image information inputted from the document camera 2. The expansion processing unit 36 outputs the image information inputted from the image information processing unit 34 as it is to the light valve drive unit 24 without performing expansion process until the range is specified by the range specifier. Thus, the entire area of the capture image Pc captured by the document camera 2 is projected from the projector 3 onto the projection surface S (see FIG. 5B).

When the user specifies a substantially rectangular range by combining L shapes formed by both hands inserted into the image capture range of the document camera 2, that is, the area above the stage 10a (see FIG. 6A), the image analysis unit 35 detects the human hands having entered the capture image Pc and determines the specification range A0 (see FIG. 9). Then, the image analysis unit 35 determines the display range A1 containing the specification range A0 and outputs range information indicating the display range A1 to the expansion processing unit 36.

The expansion processing unit 36 having received the range information from the image analysis unit 35 performs expansion process for expanding the part contained in the display range A1 for the image information inputted from the image information processing unit 34, and outputs the processed image information to the light valve drive unit 24. More specifically, the expansion processing unit 36 deletes pixel values positioned outside the display range A1 out of the image information inputted from the image information processing unit 34 and interpolates pixel values equivalent to the deleted pixel values within the display range A1 to output image information constituted by the same number of pixel values as those of image information not expanded. As a result, the expanded image of the specification range A0 specified by the user and the vicinity of the specification range A0 is projected from the image projection unit 20 onto the projection surface S (see FIG. 6B).

When the user operates the expansion display reset key of the input operation unit 32 after projection of the expanded image, the control unit 30 allows the expansion processing unit 36 to stop expansion process. Then, the expansion processing unit 36 stops expansion process in response to the request from the control unit 30 to return the image display system 1 to the normal display condition for displaying the entire area of the capture image Pc.

According to the image display system 1 (projector 3) in this embodiment described herein, the image analysis unit 35 detects the range specifier (hands of the user) having entered the image capture range of the document camera 2 and determines the specified range when the specification range is specified by the range specifier. Then, expansion process for expanding the specified range is performed by the expansion processing unit 36, and an image based on the processed image information is projected from the image projection unit 20. Thus, a desired range is only required to be specified for expanding a part of the range of the image and the necessity for performing a complicated operation can be eliminated. Moreover, human hands as the range specifier can be detected by the image analysis unit 35, and therefore a range to be expanded can be specified without using a particular tool or the like.

Third Embodiment

An image display system according to a third embodiment is hereinafter described. Similar reference numbers are given to elements similar to those in the first and second embodiments, and the same detailed explanation is not repeated.

The image display system 1 in this embodiment includes the document camera 2 and the projector 3 similarly to the first and second embodiments (see FIG. 1). In this embodiment, however, the range specifier is detected by the document camera 2, and the expansion process for expanding the range specified by the range specifier is performed by the projector 3.

Figure 11:
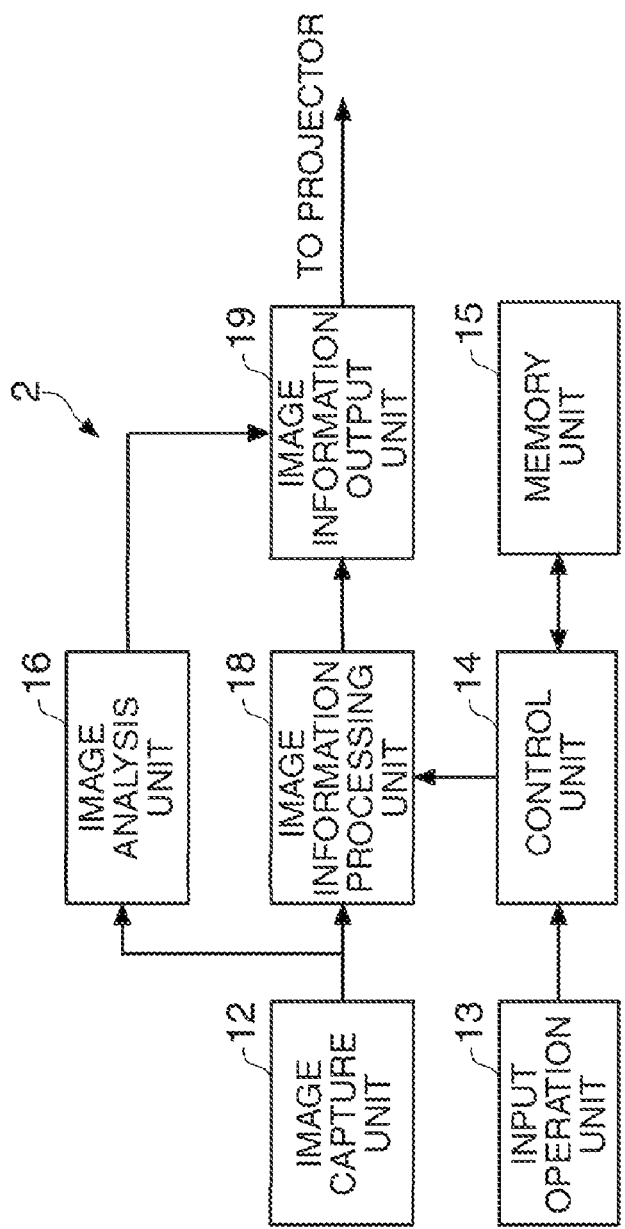
FIG. 11 is a block diagram showing a general structure of a document camera according to a third embodiment.

FIG. 11 is a block diagram showing the general structure of the document camera 2 in this embodiment.

As shown in FIG. 11, the document camera 2 includes the image capture unit 12, the input operation unit 13, the control unit 14, the memory unit 15, the image analysis unit 16, the image information processing unit 18, and the image information output unit 19.

The image analysis unit 16 analyzes the capture image Pc based on image information inputted from the image capture unit 12 to detect the range specifier inserted into the capture image Pc, that is, human hands. Then, the image analysis unit 16 determines the range specified by the range specifier (specification range A0) and further determines the display range A1 containing the specification range A0 (see FIG. 9) to output the range information showing the display range A1 to the image information output unit 19.

The image information processing unit 18 converts the image information inputted from the image capture unit 12 into image information in the form usable by the projector 3, and outputs the converted image information to the image information output unit 19.

The image information output unit 19 has USB interface (not shown) to output the image information inputted from the image information processing unit 18 and the range information inputted from the image analysis unit 16 to the projector 3 via a USB cable (not shown).

Figure 12:
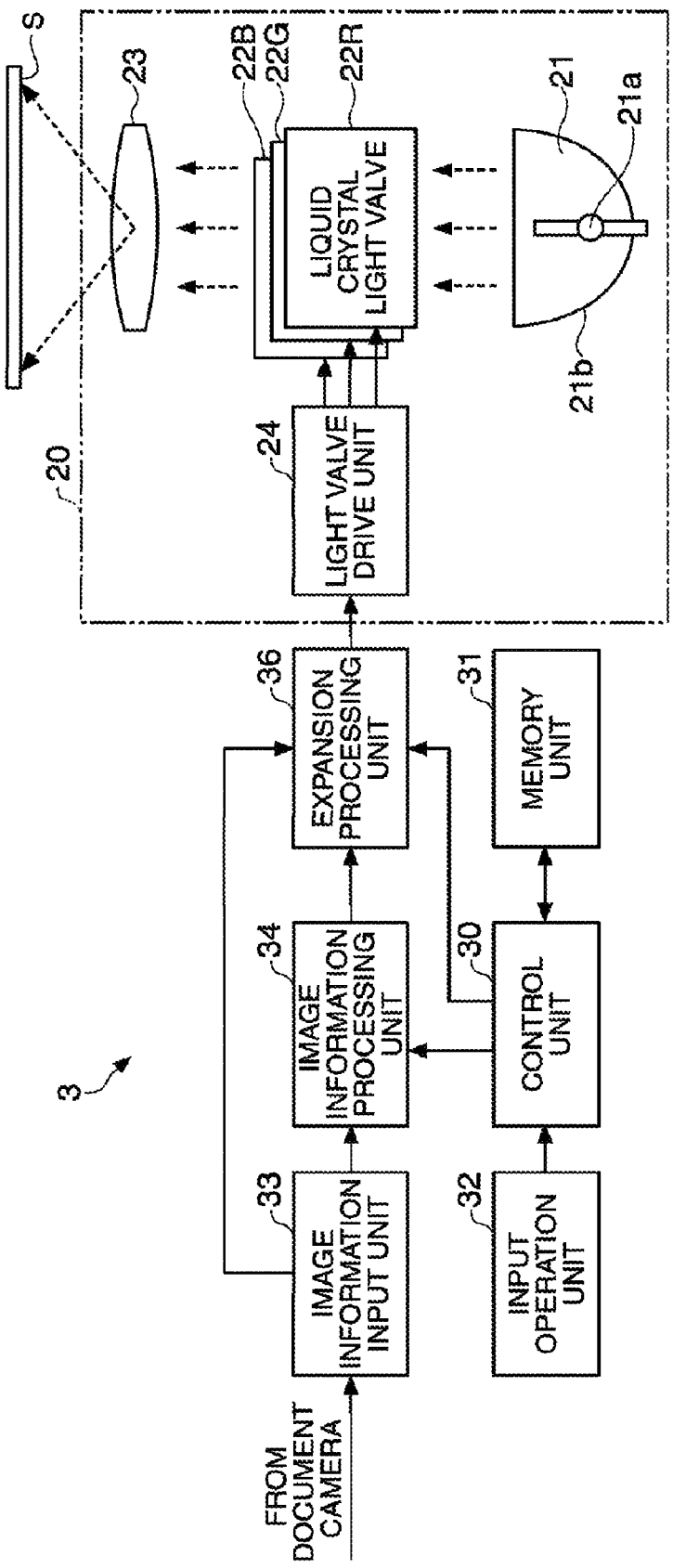
FIG. 12 is a block diagram showing a general structure of a projector according to the third embodiment.

FIG. 12 is a block diagram showing the general structure of the projector 3 in this embodiment. As shown in FIG. 12, the projector 3 includes the image projection unit 20, the control unit 30, the memory unit 31, the input operation unit 32, the image information input unit 33, the image information processing unit 34, and the expansion processing unit 36.

The image information input unit 33 has USB interface (not shown) to receive the image information and the range information from the document camera 2 via a USB cable (not shown). The image information input unit 33 outputs the inputted image information to the image information processing unit 34 and outputs the inputted range information to the expansion processing unit 36.

The image information processing unit 34 converts the image information inputted from the image information input unit 33 into image information showing gradations of the respective pixels of the liquid crystal light valves 22R, 22G, and 22B, and outputs the converted image information to the expansion processing unit 36.

The expansion processing unit 36 having received the range information from the image information input unit 33 performs expansion process for expanding the part contained in the display range A1 for the image information inputted from the image information processing unit 34, and outputs the processed image information to the light valve drive unit 24. As a result, the expanded image of the display range A1, that is, the specification range A0 specified by the user and the vicinity of the specification range A0 is projected from the image projection unit 20 onto the projection surface S.

Accordingly, the image display system 1 in this embodiment can offer advantages similar to those of the first embodiment and the second embodiment.

In this embodiment, both the image information and the range information are outputted from the image information output unit 19 of the document camera 2 to the image information input unit 33 of the projector 3 via the USB cable. Thus, the image information output unit 19 of the document camera 2 functions as a range information output unit for outputting the range information as well, and the image information input unit 33 of the projector 3 functions as a range information input unit for receiving the range information as well. It is possible to transmit the image information and the range information by different cables. In this case, however, the number of cables to be connected increases and thus usability lowers. Therefore, it is more preferable to transmit the image information and the range information by a common cable as in this embodiment.

Fourth Embodiment

Figure 13:
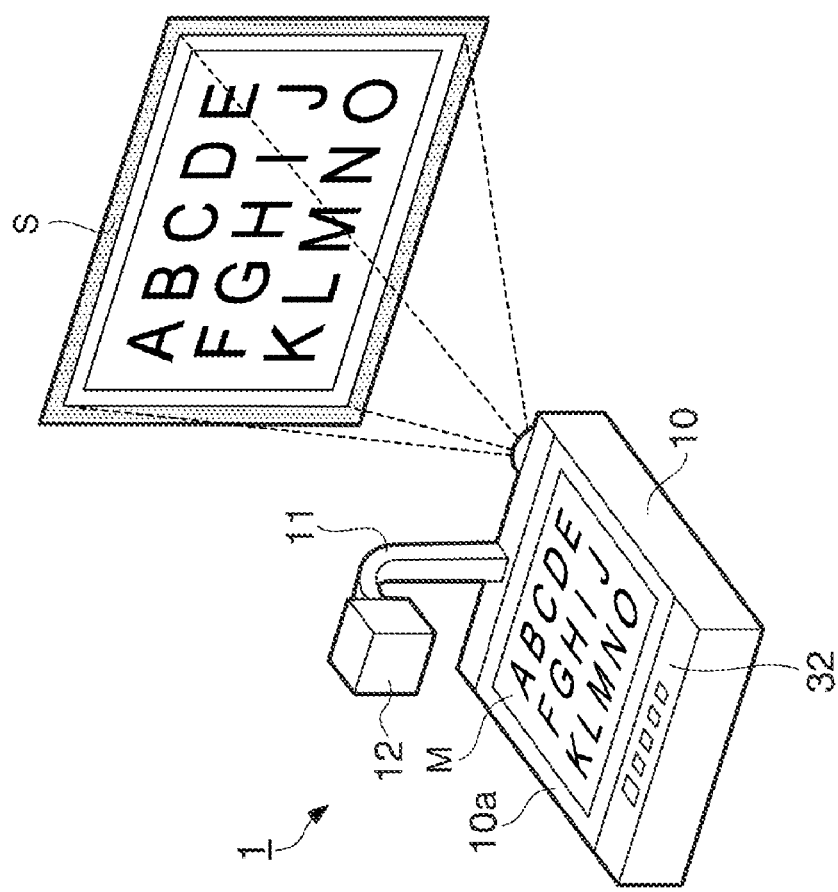
FIG. 13 is a perspective view illustrating an image display system according to a fourth embodiment.
Figure 14:
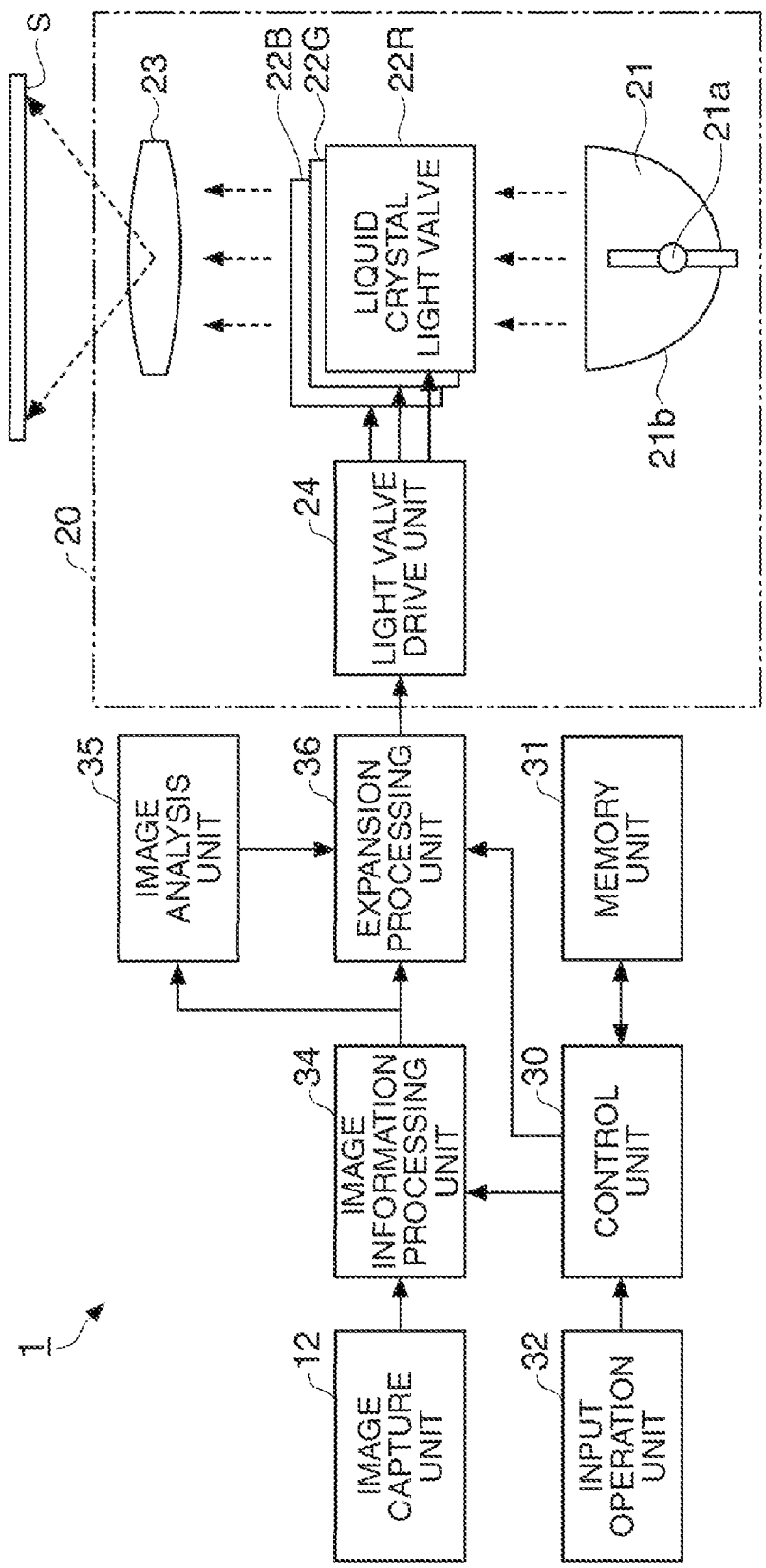
FIG. 14 is a block diagram showing a general structure of the image display system according to the fourth embodiment.

FIG. 13 is a perspective view illustrating the image display system 1 according to a fourth embodiment. FIG. 14 is a block diagram showing the general structure of the image display system 1 in the fourth embodiment.

As illustrated in FIG. 13, the image display system 1 according to this embodiment includes a document camera and a projector as one unit, and the main body of the projector (image projection unit 20 and others) is accommodated in the housing 10. As shown in FIG. 14, the image display system 1 in this embodiment has the image capture unit 12 in place of the image information input unit 33 of the projector 3 in the second embodiment (see FIG. 10).

The image information produced by the image capture unit 12 is converted into image information showing gradations of the respective pixels of the liquid crystal light valves 22R, 22G, and 22B by the image information processing unit 34, and the converted image information is outputted to both the image analysis unit 35 and the expansion processing unit 36. When the image analysis unit 35 detects the range specifier similarly to the projector 3 in the second embodiment, the expansion processing unit 36 performs expansion process to project an image based on the processed image information from the image projection unit 20.

Accordingly, the image display system 1 in this embodiment can offer advantages similar to those of the respective embodiments described above.

Fifth Embodiment

Figure 15:
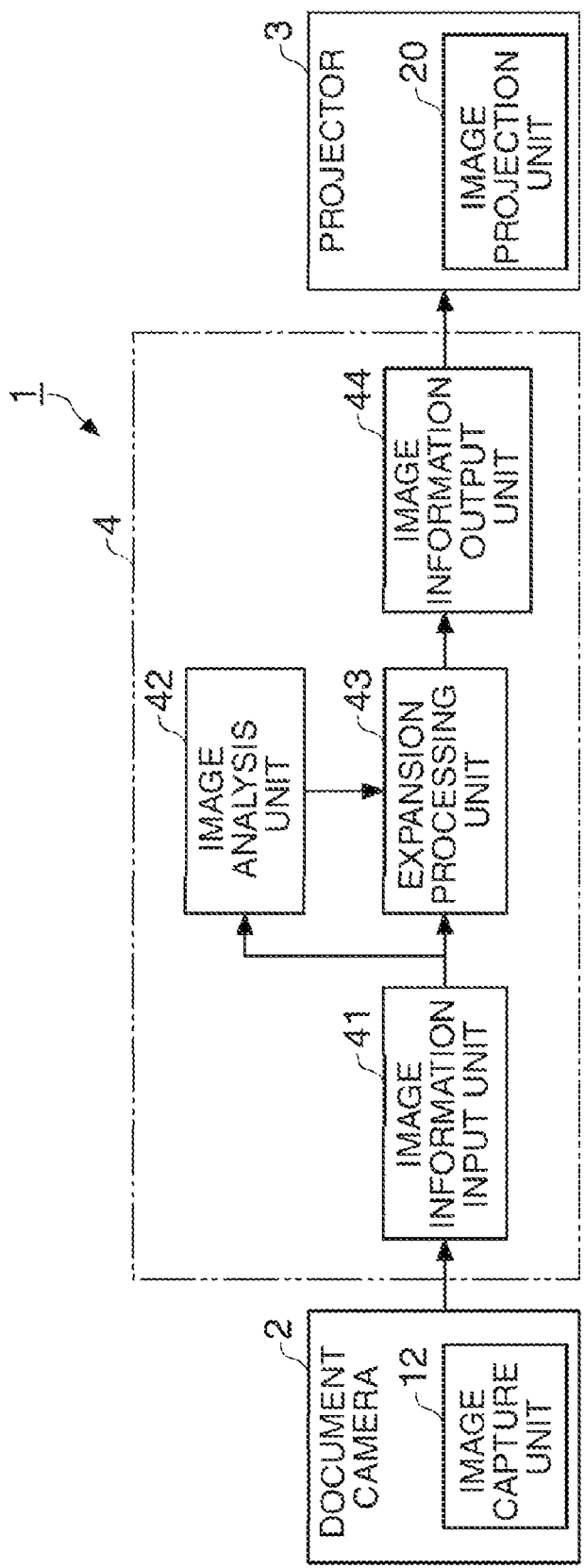
FIG. 15 is a block diagram showing a general structure of an image display system according to a fifth embodiment.

FIG. 15 is a block diagram showing the general structure of the image display system 1 according to a fifth embodiment. As shown in FIG. 15, the image display system 1 in this embodiment includes the document camera 2, the projector 3, and an expansion processing device 4. The document camera 2 is a typical document camera similar to that of the second embodiment which outputs image information showing the entire area of the image capture range produced by the image capture unit 12 to the outside. The projector 3 is a typical projector similar to that of the first embodiment which forms an image based on image information inputted from outside by the function of the image projection unit 20 and projects (displays) the formed image on the projection surface S.

The expansion processing device 4 is connected between the document camera 2 and the projector 3 to perform expansion process for image information produced by the document camera 2 and output the processed image information to the projector 3. The expansion processing device 4 has an image information input unit 41 for receiving image information from the document camera 2, an image analysis unit 42, an expansion processing unit 43, and an image information output unit 44 for outputting image information to the projector 3. The image information inputted to the image information input unit 41 is outputted to the image analysis unit 42 and the expansion processing unit 43.

The image analysis unit 42 analyzes the capture image Pc captured by the document camera 2 based on the image information inputted from the image information input unit 41 and detects the range specifier inserted into the capture image Pc, that is, human hands. Then, the image analysis unit 42 determines the range specified by the range specifier (specification range A0) and further determines the display range A1 containing the specification range A0 (see FIG. 9) to output range information indicating the display range A1 to the expansion processing unit 43.

The expansion processing unit 43 performs expansion process for expanding the display range A1 determined by the image analysis unit 42 for the image information inputted from the image information input unit 41, and outputs the processed image information to the image information output unit 44. When the image information output unit 44 outputs the image information subjected to the expansion process to the projector 3, the image within the range specified by the range specifier is expanded and projected from the projector 3.

Accordingly, the image display system 1 can offer advantages similar to those of the embodiments explained above.
Modified Example The respective embodiments described herein can be modified in the following manners.

According to the embodiments, the range to be expanded is specified by two L shapes formed by both hands. However, in a structure which can detect a human hand forming a U shape by thumb and forefinger and expand the range specified by the U shape, only one hand is required for specifying the range. Moreover, the range specifier is not limited to a human hand but may be a tool or the like for specifying the range.

According to the embodiments, the three-plate-type image projection unit 20 having the three liquid crystal light valves 22R, 22G, and 22B is used as a light modulation device. However, the image projection unit 20 may be constituted by one liquid crystal light valve which contains sub pixels transmitting R light, G light, and B light in each pixel, for example.

According to the embodiments, the transmission-type liquid crystal light valves 22R, 22G, and 22B are used as a light modulation device. However, a reflection-type light modulation device such as a reflection-type liquid crystal light valve may be employed. Alternatively, a micromirror array device which modulates light emitted from a light source by controlling emission direction of entering light for each micromirror as pixel may be used.

According to the embodiments, the light source 21 is constituted by the discharge-type light source lamp 21a. However, the light source 21 may be constituted by solid light source such as LED (light emitting diode) light source, or other types of light source.

According to the embodiments, the document camera 2 is used as an image input device. However, the image input device is not limited to the document camera 2 but may be other types of image input device (image capture device) such as a video camera.

According to the embodiments, the projector 3 is used as an image display device. However, the image display device is not limited to the projector 3 but may be other devices as long as they can form and display an image based on image information. For example, the image display device may be a rear projector which has a transmission-type screen as one unit, a liquid crystal display, a plasma display, a SED (surface-conduction electron-emitter display), an organic EL (electro luminescence) display, or other image display devices.

What is claimed is:

1. An image input device comprising:
    an image capture unit which captures an image of a predetermined image capture range to produce image information;
    an image analysis unit which, when a range specifier for specifying a partial range within the image capture range enters the image capture range of the image capture unit, detects the range specifier based on the image information, and determines the partial range specified by the range specifier;
    an expansion processing unit which performs expansion process for expanding the determined partial range of the image information produced by the image capture unit when the partial range is determined by the image analysis unit; and
    an image information output unit which outputs the image information subjected to the expansion process to the outside,
    wherein the image analysis unit:
        detects a substantial rectangle formed by the range specifier, the substantial rectangle having sides oriented in different directions than sides of the predetermined image capture range,
        determines the partial range such that the partial range has a rectangular range that contains the substantial rectangle and has sides oriented in same directions as sides of the predetermined image capture range.

2. The image input device according to claim 1, wherein the image analysis unit detects a human hand as the range specifier.

3. The image input device according to claim 2, wherein the image analysis unit detects the human hand based on the shape and color of the hand.

4. The image input device according to claim 2, wherein the image analysis unit determines the specified range by detecting a substantial rectangle formed by both hands.

5. The image input device according to claim 4, wherein the image analysis unit detects lines similar to inner edges of fingers forming the substantial rectangle and determines the range surrounded by the lines as the specified range.

6. An image display device comprising:
    an image information input unit to which image information is inputted from outside;
    an image analysis unit which, when a range specifier for specifying a partial range within an image enters the image based on the image information, detects the range specifier based on the image information, and determines the partial range specified by the range specifier;
    an expansion processing unit which performs expansion process for expanding the specified partial range of the image information inputted to the image information input unit when the partial range is determined by the image analysis unit; and an image displaying unit which forms and displays an image based on the image information subjected to the expansion process, wherein the image analysis unit:
- detects a substantial rectangle formed by the range specifier, the substantial rectangle having sides oriented in different directions than sides of the image,
- determines the partial range such that the partial range has a rectangular range that contains the substantial rectangle and has sides oriented in same directions as sides of the image.

7. The image display device according to claim 6, wherein the image analysis unit detects a human hand as the range specifier.

8. An image display system comprising:
- an image capture unit which captures an image of a predetermined image capture range to produce image information;
- an image analysis unit which, when a range specifier for specifying a partial range within the image capture range enters the image capture range of the image capture unit, detects the range specifier based on the image information, and determines the partial range specified by the range specifier;
- an expansion processing unit which performs expansion process for expanding the determined partial range of the image information produced by the image capture unit when the partial range is determined by the image analysis unit; and
- an image displaying unit which forms and displays an image based on the image information subjected to the expansion process, wherein the image analysis unit:
- detects a substantial rectangle formed by the range specifier, the substantial rectangle having sides oriented in different directions than sides of the predetermined image capture range,
- determines the partial range such that the partial range has a rectangular range that contains the substantial rectangle and has sides oriented in same directions as sides of the predetermined image capture range.

9. The image display system according to claim 8, wherein the image analysis unit detects a human hand as the range specifier.

* * * * *